United States Patent
Stolle

(10) Patent No.: US 6,859,153 B2
(45) Date of Patent: Feb. 22, 2005

(54) METHOD AND APPARATUS FOR CHANGING THE RATE OF TIME-DISCRETE SIGNALS

(75) Inventor: Reinhard Stolle, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/643,755

(22) Filed: Aug. 19, 2003

(65) Prior Publication Data

US 2004/0090354 A1 May 13, 2004

(30) Foreign Application Priority Data

Aug. 30, 2002 (DE) .......................................... 102 40 134

(51) Int. Cl.$^7$ ............................................... H03M 7/00
(52) U.S. Cl. ......................................... 341/61; 375/372
(58) Field of Search .......................... 341/61; 375/372; 358/451; 708/290

(56) References Cited

U.S. PATENT DOCUMENTS

| | | | | |
|---|---|---|---|---|
| 5,202,904 A | * | 4/1993 | Kamada | ...................... 375/372 |
| 5,237,432 A | * | 8/1993 | Calarco et al. | .............. 358/451 |
| 5,638,411 A | * | 6/1997 | Oikawa | ....................... 375/372 |
| 6,157,937 A | * | 12/2000 | Wakasugi | .................... 708/290 |

OTHER PUBLICATIONS

Gotanda et al. (U.S. Appl. No. 10/028,545), "interpolation apparatus and video signal processing apparatus including the same", filed Dec. 19, 2001.*

* cited by examiner

*Primary Examiner*—Jean Bruner Jeanglaude
(74) *Attorney, Agent, or Firm*—Holme Roberts & Owen LLP

(57) ABSTRACT

Methods and apparatus are provided for changing the rate of time-discrete signals. When changing the rate or for the interpolation of time-discrete input values (xn), output values (yk) of an output signal are produced. If the frequency of the output signal is greater than the frequency of the input signal and the shape of the output signal essentially corresponds to the shape of the input signal, the difference between a first and a second input value (xn, xn-1) subsequent to this is determined, interpolation values (PO . . . PN) of an interpolation progression (p) are scaled in dependence on the difference determined and output values (yk) in each case are produced by addition of the first input value (xn) to a scaled interpolation value (PC . . . PN).

11 Claims, 4 Drawing Sheets

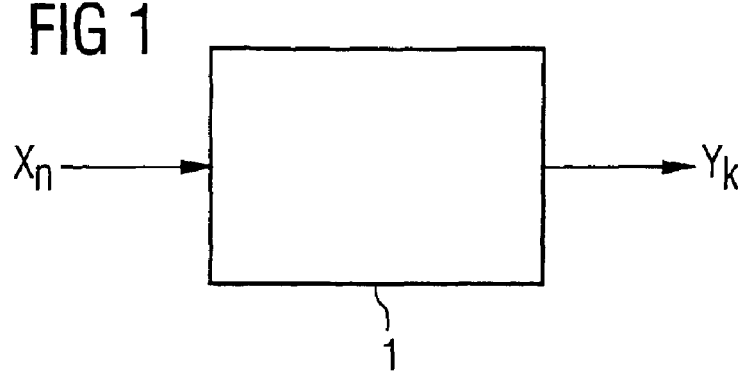
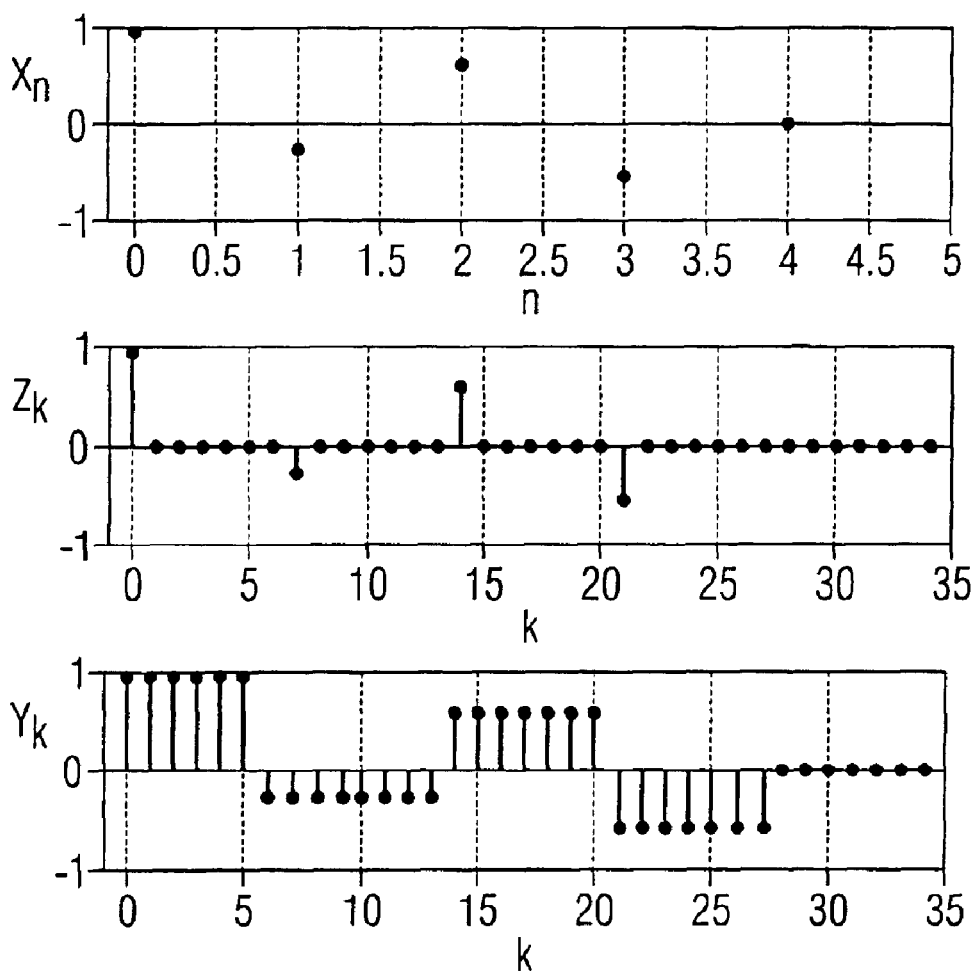

METHOD AND APPARATUS FOR CHANGING THE RATE OF TIME-DISCRETE SIGNALS

CROSS REFERENCE TO RELATED APPLICATION

This application claims priority from German application 102 40 134.9 filed Aug. 30, 2003, the disclosure of which is incorporated herein by this reference.

BACKGROUND OF THE INVENTION

The present invention relates to methods and apparatus for interpolating input values of an input signal, whereby output values of an output signal are produced, whose frequency is greater than the frequency of the input signal and whereby the shape of the output signal essentially corresponds to the shape of the input signal.

This kind of interpolation, in which input values occurring at a first frequency are converted into output values occurring at a higher second frequency, is also described as rate changing. This kind of rate changing or interpolation within the meaning of the present invention is used for example in cases where an output signal of a fixed frequency is to be produced without loss of data from time-discrete input signals of varying frequencies. This kind of application results, for example, in the case of data transmission with pulse amplitude modulation. In this case, it is unimportant for the present invention whether the ratio between the frequency of the output signal and the frequency of the input signal is an integer or a non-integer amount.

For interpolation or rate changing, it is known in the prior art to take over the input values and fill them in with certain number of zeros, so that the desired rate or frequency of the output signal is obtained. Apart from this, it is also known to take over the input values and additionally to repeat the single input values, until the desired rate of the output values or the desired frequency of the output signal is obtained. This kind of method is represented in FIG. 2. Here, $x_n$ designates a number of input values, to which a higher number of output values is to be assigned. In this case, the output values are designated with $z_k$ according to the principle of zero filling and the output values with $y_k$, for the production of which no zeros are used, but input values $x_n$ are often repeated. In the cases represented in FIG. 2, the ratio between the frequency of the output signal and the frequency of the input signal is 7, that is to say in each case 7 output values must be produced from one input value.

If the rate change ratio or the ratio between the frequencies of the input signal and the output signal is not an integer amount, particular problems arise. FIG. 3 shows the case where the rate change ratio is 7.5. Both output signals $z_k$ and $y_k$ are again produced by the method of zero filling described above or holding or repeating single input values. As evident from the diagrams, the output values $z_k$, $y_k$, which are obtained by directly taking over a new input value $x_n$, do not necessarily coincide with these in the time domain. Thus, the second and the third input value $x_n$ in each case lie in the time domain between two adjacent output values $z_k$, $y_k$. As a result, the disadvantage arises that the input values $x_n$ and the signal changes corresponding to these in the output signal or in the case of the output values $z_k$, $y_k$ are not always in phase.

In order to overcome this disadvantage, it is also known to fold the input values $x_n$ onto a certain interpolation progression, whereby an interpolation pulse is assigned to each input value $x_n$, which in regard to its time location is aligned to the assigned input value $x_n$. The output values are computed in such a way that they follow the progression of the interpolation pulses. Output values $z_k$, $y_k$ produced by this method are represented in FIG. 4, whereby zk replicates the sequence of the output values according to the zero filling method and $y_k$ the sequence of the output values according to the holding method. This computation more particularly in the case of the output values $y_k$ produced by the holding or repeat method requires an unfavorably high computational cost.

BRIEF SUMMARY OF THE INVENTION

Therefore, an object of the present invention is to create a method or a device for interpolating input values of an input signal of the type detailed above whereby the cost is reduced.

This object is achieved according to the invention by a method including the steps of determining the difference between a first and a subsequent second input value; scaling interpolation values of an interpolation progression in dependence on the difference determined between the first and a subsequent second input value; and producing successive output values by addition of the first input value to a scaled interpolation value.

An apparatus in accordance with the invention includes means for producing output values of an output signal in dependence on the input value of an input signal, wherein the frequency of the output signal is greater than the frequency of the input signal and the shape of the output signal essentially corresponds to the shape of the input signal; means for determining the difference in each case between a first and a subsequent second input value; means for scaling interpolation values of an interpolation progression in dependence on the difference determined between the first and subsequent second input value; and means for producing successive output values in each case for addition of the first input value to a scaled interpolation value.

DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 shows a block diagram of a device for interpolating time-discrete input values, FIG. 2 shows the interpolation of the zero order of time-discrete input values with a rate change ratio, which is an integer amount.

DETAILED DESCRIPTION OF THE INVENTION

Figure 3:
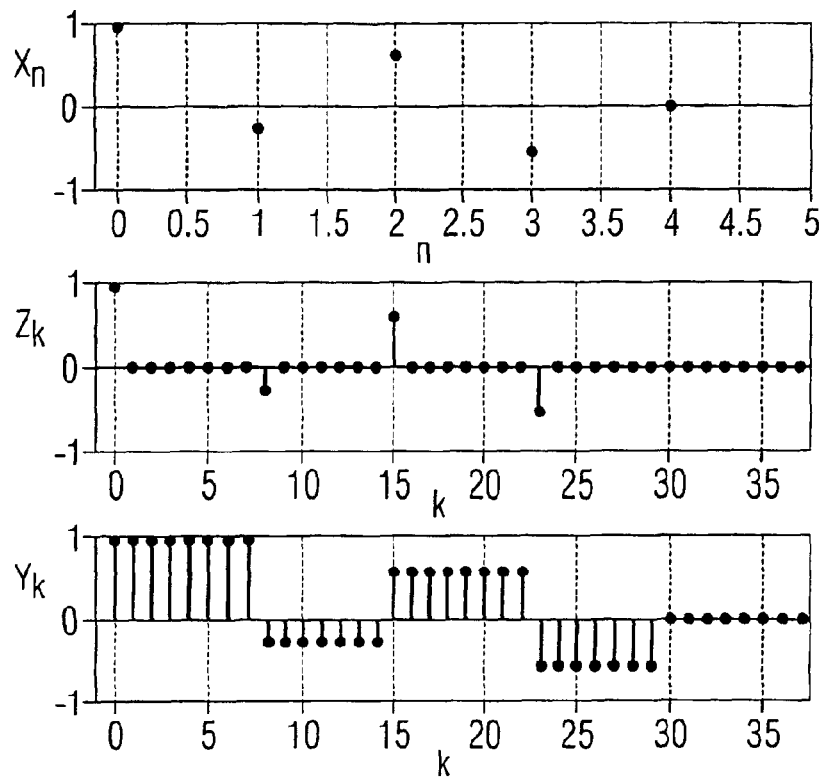
FIG. 3 shows the interpolation of the zero order of time-discrete input values with a rate change ratio, which is not an integer amount.

Interpolation values according to the invention are provided along an interpolation progression, whereby the interpolation values are used for computing the transitions from one input value to the next. For this purpose, the difference is determined between a first input value and the following second input value and the interpolation values are scaled in dependence on the difference determined. At least part of the output values is produced in each case subsequently by the first input value being added in each case to a scaled interpolation value. Thus, the progression of the output values, which corresponds to the jump from one input value to the next can be computed at minimal cost.

The method according to the invention can be used for input values or output values, which are equally spaced or not equally spaced in the time domain.

The number of interpolation values of an interpolation progression depends on the order of the interpolation. An interpolation method of higher order has several interpolation values within an interpolation progression, so that the transition from one input value to the next input value in the case of the output values results in a higher number of output values. The number of interpolation values used for an interpolation progression is equal to the order of the interpolation plus 1.

If the frequency ratio between output signal and input signal is greater than the number of interpolation values in an interpolation progression, advantageously not all output values have to be produced by adding an input value to at least one scaled interpolation value. Instead, it is also possible to produce output values according to the interpolation progression simply by the fact that either the last output value produced by addition or the second input value is repeated. This repetition takes place as often as necessary until the next input value is obtained and the output values are again computed by adding an input value to at least one interpolation value.

Advantageously, the interpolation values are computed in dependence on the phase difference or the time difference between an input value and an output value. Thus, it is possible to ensure that the time location of the interpolation progression can be exactly aligned with the input values and at the same time the time location of the interpolation values in the interpolation progression can be exactly matched to the clock of the output values. More particularly, for this purpose the time difference is determined between the first input value in each case and the output value to be emitted next. This time difference is applied to the continuous progression of the interpolation profile, in order to determine the time location of the first interpolation value related to the time plane of the interpolation progression. The following interpolation values follow on the time plane of the interpolation progression in the time domain of the output values.

When computing the output values, it is proposed that the first input value for computing an output value is added in each case to only one interpolation value. With this method, the interpolation values are advantageously selected in such a way that the second input value is almost obtained at the end of the interpolation progression or with addition of the first input value to the last interpolation value. The following output values are produced by taking over the second input value.

In the case of the method described above, the interpolation progression is selected advantageously so that it begins with the value zero.

After the transition from the first input value to the second input value has finished in the case of the output values computed with the aid of the interpolation values, the series of output values can also be continued with a same value, by the interpolation values being applied so that they no longer change and further computations lead to no other result. Advantageously however, the series of the output values is continued by using the second input value for these and frequently repeated accordingly. In this way, the computational cost can be greatly reduced.

In an advantageous embodiment, the output values are produced with the aid of a chain of delay elements, whereby the delay elements can be formed analogously or digitally and the values of the results stored in the individual delay elements can be reproduced in the clock of the output values. The delay elements are expanded by adders, with which the interpolation values can be added either on the output or input at least of some of the delay elements.

Initially, the first input value without addition of interpolation values is shifted to several delay elements. Subsequently, for the length of a shift cycle the interpolation values are offered for summation, so that at the end of this clock cycle the sum of the input value in each case with a locked on interpolation value is stored in each case in the next delay elements of the chain. The correct values for the output values are thus already stored in the delay elements, to be emitted simply by being sent out from the delay elements of the chain. The first interpolation value for computing the first output value in dependence on the interpolation progression in this case must be offered with regard to the last delay element, since this contains the first value emitted.

In order to obtain the difference between the first input value and the second input value a subtracter and a delay element are preferably used, whereby the delay element is fed with the input values and holds the previous input value in each case ready on the output. The subtracter provides the difference between the input of the delay element or the current input value and the output of the delay element or the previous input value.

The device 1 represented in FIG. 1 for interpolating time-discrete input values $X_n$ produces time-discrete output values $y_k$ at the output, whereby the frequency of the output values $y_k$ is greater than the frequency of the input values $x_n$. For this reason, the output values $y_k$ possess a different index k to the input values $x_n$, whose index is n. The frequency ratio between the output values $y_k$ and the input values $x_n$ can be an integer as well as a non-integer amount.

To assist in understanding of the present invention, the result of the interpolation of input values $x_n$ is shown in FIG. 2, whereby output values $x_k$ or $y_k$ have been obtained in two different ways. The output values $z_k$ were computed according to the zero filling method, whereby the spaces between two adjacent input values $x_n$ and $x_{n+1}$ have been filled in with a corresponding number of zeros. In the case of the output values $y_k$ shown underneath the holding or repeat method has been applied, whereby repeated use of an input value $x_n$ as output value is made until a new input value arose. In FIG. 2 the rate change or interpolation is represented with the integer amount 7. FIG. 3 corresponds to the representation of FIG. 2, whereby the rate change ratio is 7.5 instead of 7 and thus is not an integer amount. In the sequences of the output values $z_k$ and $y_k$ it can clearly be seen that the value or flank different from zero in the case of a value jump is not necessarily synchronous with the causal input value $x_n$.

Figure 4:
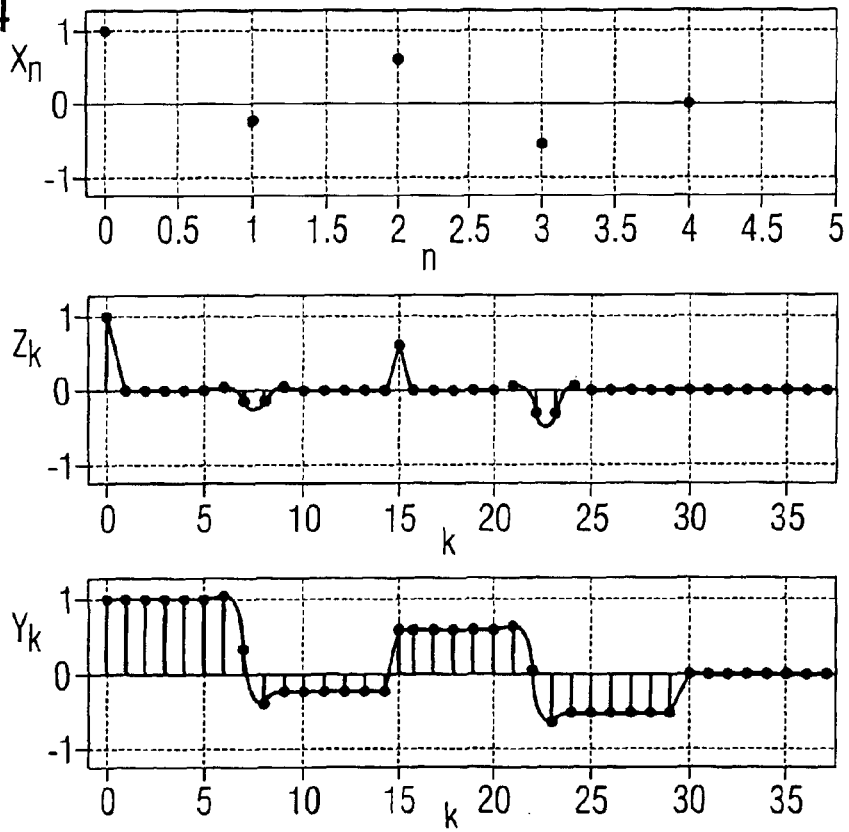
FIG. 4 shows the interpolation of the third order of time-discrete input values with a rate change ratio, which is not an integer amount.

In order to exclude this phase difference, the input values $x_n$ are folded onto interpolation pulses, as a result of which the profiles represented in FIG. 4 occur. Clearly, it is to be seen that although the individual output values $z_k$ or $y_k$ are not synchronous with the input values $x_n$, the maxima or flanks of the signals formed by the output values $z_k$ or $y_k$ are synchronous with the input values $x_n$.

In the following, an embodiment of the present invention is described, in which the output values $y_k$ can be produced in accordance with FIG. 4.

In the embodiment when a new input value $x_n$ is received the difference between the new input value $x_n$ and the previous input value $x_{n-1}$ is obtained. In the following, the current or new input value is designated as the second input value and the previous input value is designated as the first input value.

Figure 7:
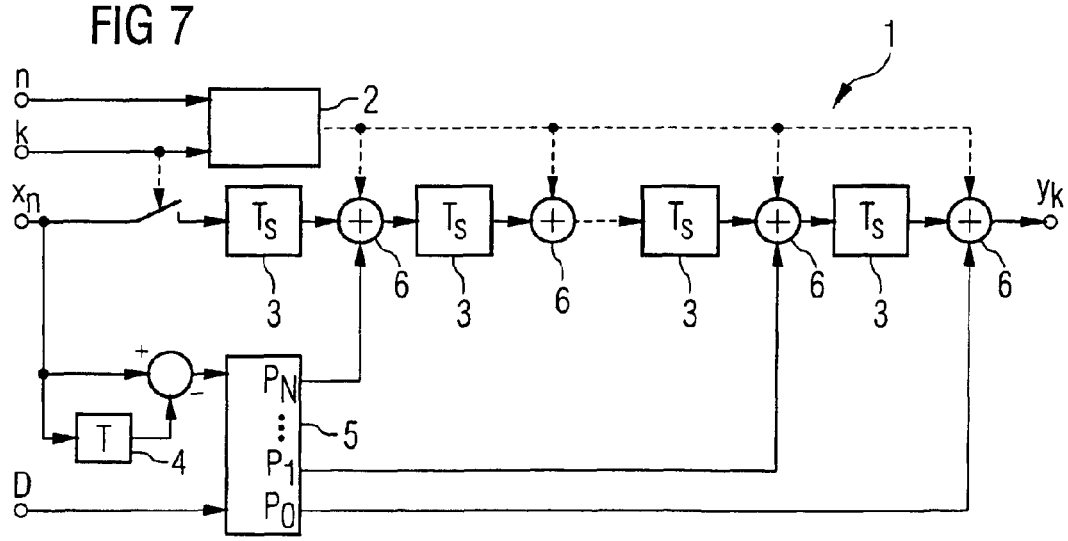
FIG. 7 shows a device to implement the method according to the invention according to the exemplary embodiment of this invention.

The embodiment of the present invention can be implemented with the device represented diagrammatically in FIG. 7, which is described below. Central element of the device 1 in accordance with FIG. 7 is a chain of delay elements 3, which pass on the values in each case stored in the clock of the output values $y_k$. At the output of each delay element 3 is provided an adder 6, which passes on to the subsequent delay element 3 the sum of the value of the previous delay element 3 and an interpolation value PO . . . PN made available by an interpolation value generator 5. Additionally, the adders 6 are equipped so that they can be actuated by a control 2, whereby with the aid of the control it can be determined whether the adders 6 add the locked on interpolation values PO . . . PN or otherwise. The sequence of the output values $y_k$ finally lies at the output of the last adder 6. Device 1 is controlled by the clock n of the input values $x_n$, the clock k, with which the output values $y_k$ are to be emitted, the input values $x_n$ as well as a time difference D. The time difference D is computed by a component (not illustrated) and represents the time difference between the occurrence of the first input value and the time-point, at which the next output value is to be emitted after the first input value.

The basic principle of the embodiment consists of adding the first input value to a series of interpolation values, so that a transition from the first input value to the second input value is produced with an increased number of support points, which are formed by the output values $y_k$.

In accordance with the embodiment, the output values $y_k$ are produced by adding the first input value in each case to an interpolation value. A possible progression of the interpolation values is represented in the lowest diagram in FIG. 5 and designated with P, whereby arbitrary profiles are possible. The interpolation values P represent the points marked with small circles along an interpolation profile, which is represented as a continuous line. The interpolation progression is continuous, starts with 0 and ends with 1. The interpolation value represented first or on the left does not lie at the time value 0 on the continuous interpolation profile, but at a point, which corresponds to the time difference D, in order to take into account the fact that at the time-point of the output value $y_k$ to be computed as the first, the first input value $x_n$ used for this computation has already passed the time difference D. The following interpolation values lie in the time domain of the output values $y_k$. In this example, the time difference D is equal to 0.3, so that the first interpolation value is determined with the factor 0.3. The second interpolation value is determined with the factor 1.3, the third interpolation value with the factor 2.3 and the fourth interpolation value with the factor 3.3, whereby the factors are related to the time duration of the output signal. With the aid of these four interpolation values in this example of interpolation of the third order four output values $y_k$ can be computed, whereby with the fourth interpolation value the second input value can almost be obtained, so that for the fifth output value following on from these the second input value can already be used. However, before the interpolation values are added to the first input value $x_n$, interpolation values must be scaled with the difference between the first input value and the second input value, so that in the end the second input value is also obtained with the last interpolation value.

Generally, in the case of an interpolation of the nth order n+1 interpolation values are used, with which n+1 output values are produced by addition to the first input value. The n+1th output value advantageously almost reaches at least the second input value and the output values following the n+1th can be produced by repeating the second input value.

In order to perform the aforementioned computation, the output values in each case are divided into a base portion $v_k$ and an interpolation portion $w_k$. The base portion $v_k$ corresponds to the first input value and interpolation portion $w_k$ corresponds to the scaled interpolation values, whereby according to the last fourth interpolation value the series of the values of the interpolation portion $w_k$ is filled in with zeros, until the next input value occurs and thus the next series of interpolation values.

In the sequence of the values of the base portion $v_k$, the value of the first input value is continued or repeated in each case up to the last interpolation value, so that at the time-point where zero values join the interpolation values in the interpolation portion $w_k$, the second input value is used in the base portion $v_k$.

This computation is performed with the device 1 according to FIG. 7, by the current input value $x_n$ in the clock of the output values $y_k$ being entered in the delay elements 3 of the chain, whereby the first delay element 3 represented on the left is designed to delay by only one clock cycle of the output values $y_k$. Simultaneously, the time difference D and the difference between the current input value and the previous input value lie on the interpolation value generator 5. The interpolation value generator thereupon produces the interpolation values PO . . . PN, whereby the device 1 is represented generally in FIG. 7 and N is the number of interpolation values used minus 1. At this time-point, the adders 6 are not yet actuated by the control 2, so that the current input value is shifted through the chain of the delay elements 3 unaltered. As soon as a new input value $x_n$ is received or on arrival of a flank of the clock n of the input values $x_n$ the control 2 with the next clock k of the output values $y_k$ occurring controls the adders 6 in such a manner that they add the locked on interpolation values PO . . . PN. Consequently, in each case the sum of the input value $x_n$ previous to this time-point and in each case of an interpolation value PO . . . PN lies on the outputs of the adders 6. This sum is immediately emitted in the case of the last adder 6 represented on the right or in the case of the remaining adders 6 shifted further through the chain of the delay elements 3, so that the output values $y_k$ are emitted in succession.

Figure 5:
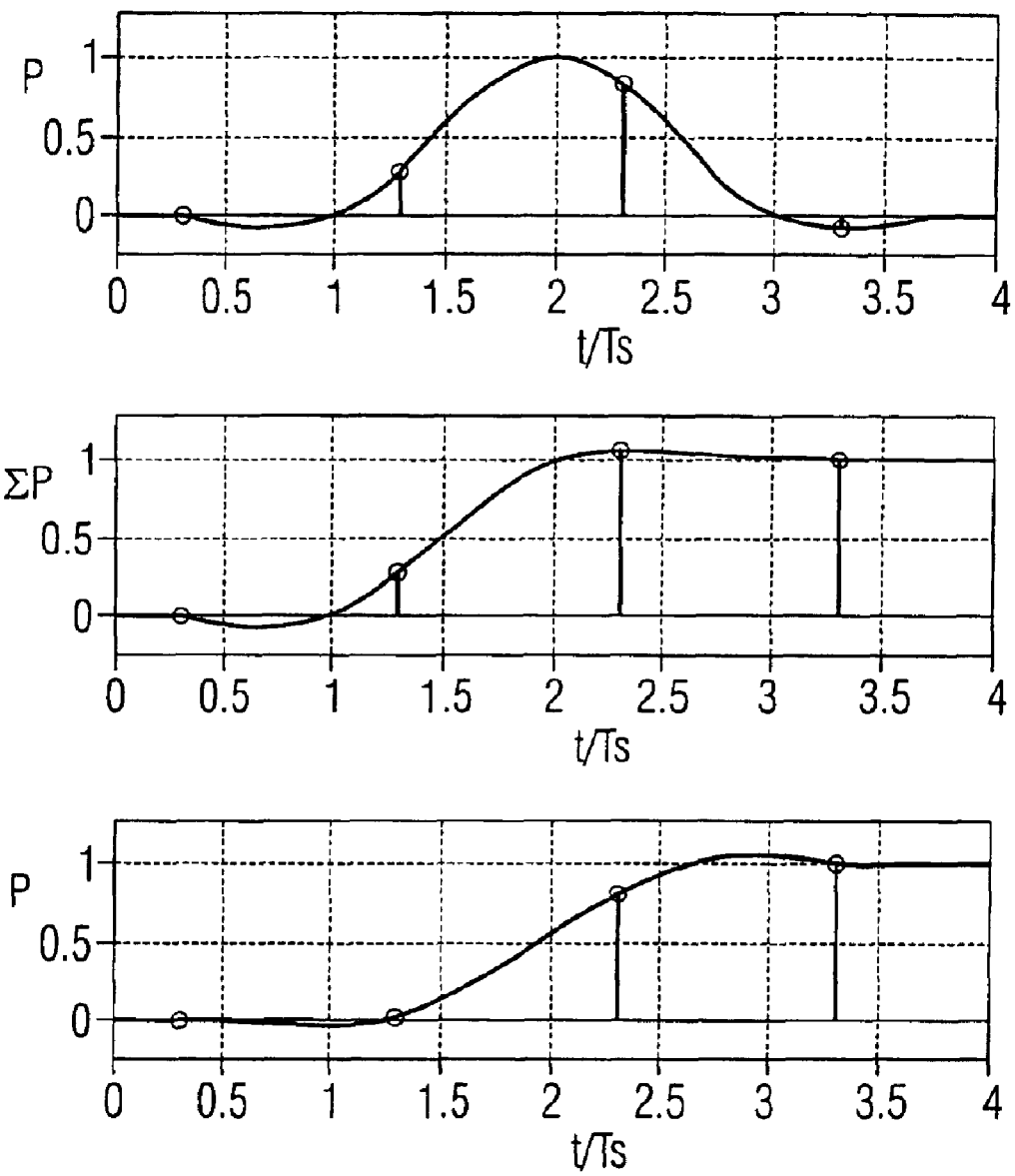
FIG. 5 shows interpolation progressions for use in an embodiment of the present invention.
Figure 6:
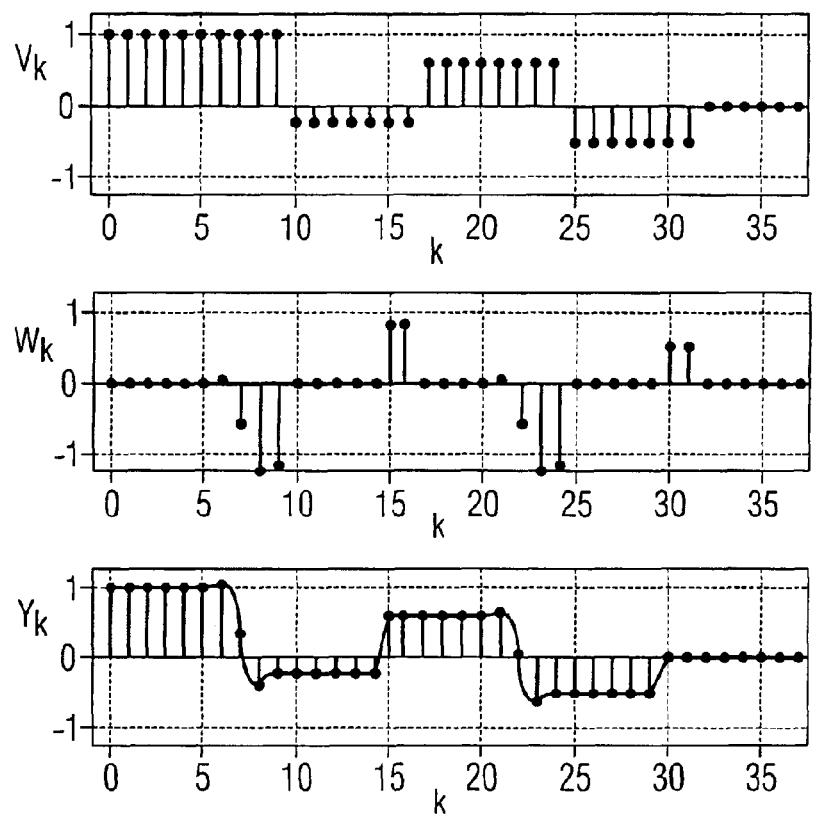
FIG. 6 shows the profiles of auxiliary signals in order to produce interpolated output values according to the embodiment of the present invention.

The interpolation profile with the values P, represented at the bottom of FIG. 5, was the result of analytic integration of the profile of an interpolation pulse p, which is represented in FIG. 5 top. Apart from the analytic integration, the profile of the basic interpolation progression can also be numerically integrated, whereby the integral profile in the latter case is represented in FIG. 5 in the center with Σp. The difference of the profiles with numeric or analytic integration results from the fact that time-limited signals as the interpolation pulse p possess a theoretically infinite bandwidth and due to the finite sampling rate an alias error always develops so that for computing the interpolation values PO . . . PN use of the analytically integrated profile is preferred.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for the interpolation of input values of an input signal, with which method output values of an output signal are produced, in which the sampling sequence frequency of the output signal is greater than the sampling sequence frequency of the input signal and the shape of the output signal essentially corresponds to the shape of the input signal, comprising the steps of:

determining the difference between a first and a subsequent second input value;

scaling interpolation values of an interpolation progression in dependence on the difference determined between the first and a subsequent second input value; and producing successive output values by addition of the first input value to a scaled interpolation value.

2. A method according to claim 1, wherein the input values and the output values are spaced equally in the time domain.

3. A method according to claim 1, wherein the input values and the output values are spaced equally in the time domain and the interpolation values are computed in dependence on the phase difference between an input value and an output value.

4. A method according to claim 1, wherein after the output values have been produced by addition of the first input value to at least one scaled interpolation value, output values are produced by equating with the last output value produced by addition or with the second input value.

5. A method according to claim 1, wherein the interpolation progression ends with a different value than that with which it starts.

6. A method according to claim 1, wherein the profile of the interpolation progression begins with zero.

7. A method according to claim 1, wherein the output values are produced by means of a chain of delay elements, whereby an input value at the start of the chain is used, the values of the delay elements are passed on in the clock of the output values and an interpolation value is added at the input, the output, or the input and the output of at least one delay element.

8. A method according to claim 1, wherein the interpolation progression is wholly or partly present in the form of at least one mathematical description and the interpolation values are computed by application of the at least one mathematical description.

9. A method according to claim 1, wherein the input values are data symbols of a data transmission with pulse amplitude modulation.

10. A method according to claim 1, wherein the input values are data symbols of a data transmission according to a DSL standard.

11. An apparatus for the interpolation of input values of an input signal, comprising:

means for producing output values of an output signal in dependence on the input value of an input signal, wherein the frequency of the output signal is greater than the frequency of the input signal and the shape of the output signal essentially corresponds to the shape of the input signal;

means for determining the difference in each case between a first and a subsequent second input value;

means for scaling interpolation values of an interpolation progression in dependence on the difference determined between the first and subsequent second input value; and means for producing successive output values in each case for addition of the first input value to a scaled interpolation value.

* * * * *

UNITED STATES PATENT AND TRADEMARK OFFICE
CERTIFICATE OF CORRECTION

PATENT NO. : 6,859,153 B2 Page 1 of 1
DATED : February 22, 2005
INVENTOR(S) : Reinhard Stolle It is certified that error appears in the above-identified patent and that said Letters Patent is hereby corrected as shown below:

Title page,
Item [30], Foreign Application Priority Data, change
"102 40 134.9 filed Aug. 30, 2003, the disclosure of which is"
to
-- 102 40 134.9 filed Aug. 30, 2002, the disclosure of which is --

Signed and Sealed this

Seventh Day of June, 2005

JON W. DUDAS
*Director of the United States Patent and Trademark Office*